United States Patent [19]
Kooyker et al.

[11] Patent Number: 5,592,872
[45] Date of Patent: Jan. 14, 1997

[54] KITCHEN MACHINE WITH ELASTIC FRAME SUSPENSION

[75] Inventors: Klaas Kooyker; Adam Weits, both of Hoogeveen; Frans Van Der Vinne, Drachten, all of Netherlands

[73] Assignee: U.S. Philips Corporation, New York, N.Y.

[21] Appl. No.: 303,546

[22] Filed: Sep. 9, 1994

Related U.S. Application Data

[63] Continuation of Ser. No. 16,353, Feb. 11, 1993, abandoned.

[30] Foreign Application Priority Data

Feb. 18, 1992 [EP] European Pat. Off. ............. 92200457

[51] Int. Cl.$^6$ ...................................... A47J 43/046
[52] U.S. Cl. .................. 99/510; 99/511; 99/348
[58] Field of Search ............................ 99/510, 511, 348; 241/46.17, 92, 199.12, 282.1, DIG. 30; 366/205, 314, 601; 248/605, 612, 634, 638

[56] References Cited

U.S. PATENT DOCUMENTS

| | | | |
|---|---|---|---|
| 1,165,288 | 12/1915 | Rimmer | 248/612 |
| 2,711,871 | 6/1955 | Eck | 248/612 |
| 3,749,371 | 7/1973 | Folkenroth et al. | 248/605 |
| 4,079,882 | 3/1978 | Mizuyoshi et al. | 248/638 |
| 4,687,173 | 8/1987 | Genna | 248/638 |
| 5,074,201 | 12/1991 | Takeyama et al. | 99/510 |
| 5,236,135 | 8/1993 | Wilson et al. | 99/510 |

FOREIGN PATENT DOCUMENTS

| | | |
|---|---|---|
| 0409335 | 7/1990 | European Pat. Off. |
| 1200074 | 12/1959 | France . |
| 3205710 | 8/1983 | Germany . |
| 0691231 | 4/1951 | United Kingdom . |
| 2082713 | 3/1982 | United Kingdom . |

*Primary Examiner*—Timothy F. Simone
*Assistant Examiner*—Reginald L. Alexander
*Attorney, Agent, or Firm*—Ernestine C. Bartlett

[57] ABSTRACT

A kitchen machine provided with a housing (1) and an attachment (9) with a rotatable tool (17) which can be placed on the housing (1). The tool (17) can be driven by an electric motor (25) which is arranged in the housing (1) and fastened to a frame (39). The frame (39) is fastened to the housing (1) by means of elastically deformable suspension elements (65, 83), which suspension elements (65, 83) are each supported by a support member (69, 85) of the housing (1). The suspension elements (65, 83) have a mechanical stiffness which depends on a surface area of a contact face (73, 93) present between each suspension element (65, 83) and the relevant support member (69, 85). The said surface area and the mechanical stiffness increase with an increase in the mechanical load acting on the frame (39).

Since the mechanical stiffness of the suspension element (65, 83) increases with an increase in the mechanical load acting on the frame (39), a good noise insulation of the electric motor (25) is achieved in the case of a low load on the frame (39), while a good protection of the frame (39) and the electric motor (25) against load fluctuations is achieved in the case of a high load.

10 Claims, 5 Drawing Sheets

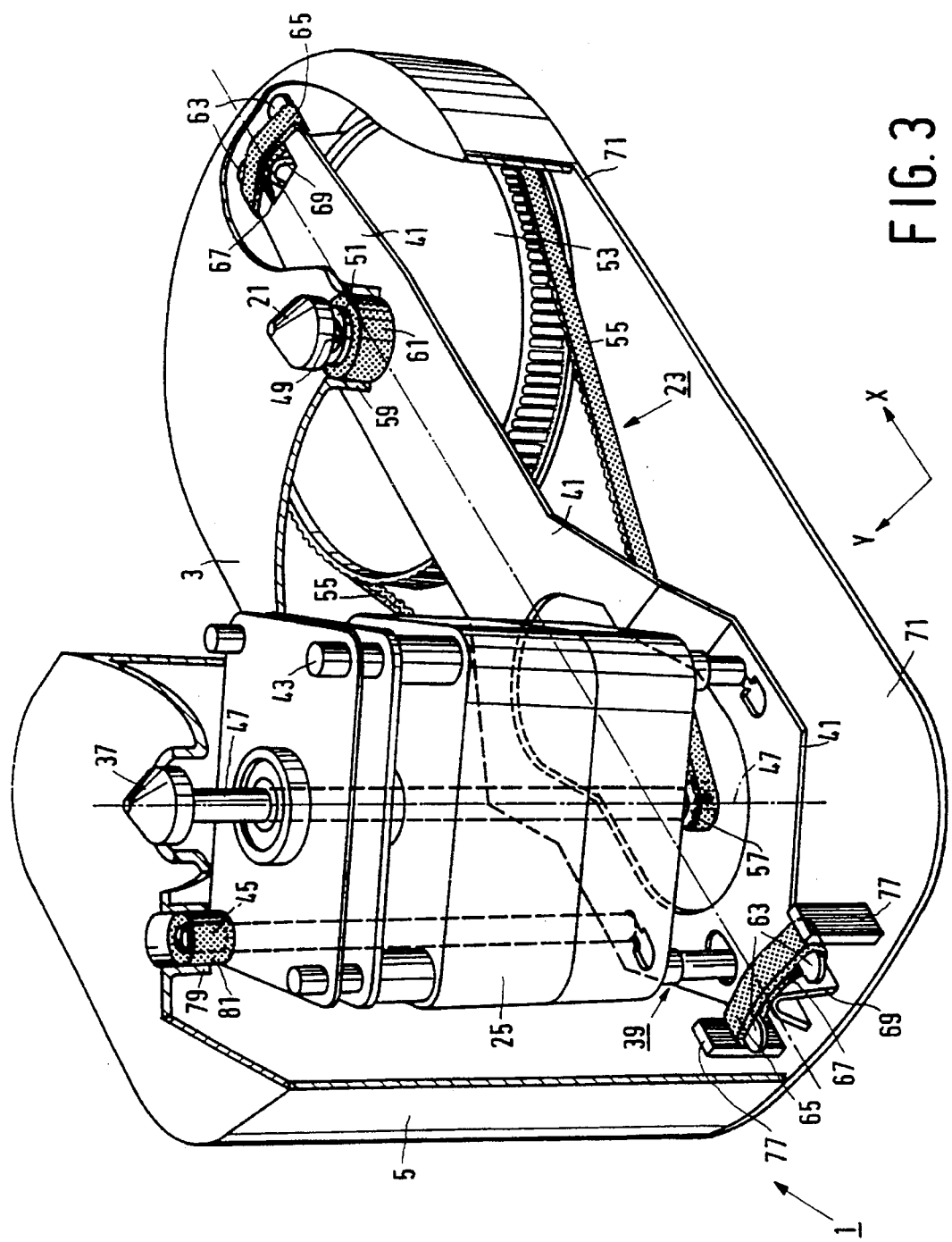

KITCHEN MACHINE WITH ELASTIC FRAME SUSPENSION

This is a continuation of application Ser. No. 08/016,353, filed Feb. 11, 1993, now abandoned.

FIELD OF THE INVENTION

The invention relates to a kitchen machine provided with a housing and a rotatable tool which is drivable by an electric motor arranged in the housing, which electric motor is fastened to a frame which is fastened to the housing via at least one elastic element.

BACKGROUND OF THE INVENTION

A kitchen machine of the kind mentioned in the opening paragraph is known from European Patent Application 0 409 335 A1. The electric motor of the known kitchen machine is fastened to a frame plate to which also a transmission mechanism is fastened, by means of which mechanism the tool is coupled to the electric motor. The frame plate is clamped between two portions of the housing by means of two rubber rings. The use of the rubber rings protects the electric motor and the transmission mechanism fastened to the frame plate against high mechanical loads which may occur, for example, when the kitchen machine is moved, transported or dropped.

A disadvantage of the known kitchen machine is that the transmission to the housing of vibrations caused by the electric motor and the transmission mechanism during operation is insufficiently counteracted by the use of the said rubber rings, so that the noise caused by the electric motor and the transmission mechanism is insufficiently damped.

SUMMARY OF THE INVENTION

It is an object of the invention to provide a kitchen machine of the kind mentioned in the opening paragraph in which the transmission to the housing of vibrations caused by the electric motor during operation is prevented as much as possible.

According to the invention, the kitchen machine is for this purpose characterized in that the elastic element is an elastically deformable suspension element supported by a support member of the housing whereby a surface area of a contact face between the suspension element and the support member and a mechanical stiffness of the suspension element depending on the said surface area increase with an increase in the mechanical load acting on the frame. Since the surface area of the contact face between the elastically deformable suspension element and the support member increases with an increase in the mechanical load acting on the frame, the suspension element has an effective length which decreases with an increase in the said load. It is achieved by this that the suspension element under normal operating conditions, when the load on the frame is comparatively low, has a comparatively small mechanical stiffness so that the transmission of the vibrations of the electric motor is counteracted to a substantial degree and a good insulation against the noise caused by the electric motor is provided. In the case of a high mechanical load, for example, when the kitchen machine is moved, transported, or dropped, the suspension element has a comparatively high mechanical stiffness, so that load fluctuations which may occur in the case of a high load on the frame cause a comparatively small elastic deformation of the suspension element and comparatively small displacements of the frame relative to the housing.

A special embodiment of a kitchen machine according to the invention is characterized in that the suspension element rests on a curved support surface of the support member. The use of the curved support surface achieves in a constructionally simple manner that the contact face between the suspension element and the support member has a surface area which increases when the mechanical load acting on the frame increases. In addition, a favorable change in the mechanical stiffness of the suspension element as a function of the load acting on the frame can be achieved through optimizing the curvature of the support surface.

A further embodiment of a kitchen machine according to the invention, which provides a simple and practical construction of the suspension element, is characterized in that the suspension element is an elastically deformable suspension ring which is provided around two projections of the frame.

A yet further embodiment of a kitchen machine according to the invention, which provides a simple and practical construction of the support member, is characterized in that the support member is a support ridge with a curved end provided on a bottom plate of the housing, while the two projections of the frame are present on either side of the support ridge.

A particular embodiment of a kitchen machine according to the invention, in which the frame comprises a frame plate, is characterized in that the frame plate is provided with at least two pairs of projections and is supported by at least two support members of the housing via at least two suspension rings.

A further embodiment of a kitchen machine according to the invention, which provides a simple, sturdy and wear-resistant construction of the suspension element, is characterized in that the suspension element is a leaf spring whose first end is fastened to the frame and whose second end is fastened to the housing.

The invention will be explained in more detail below with reference to the drawing in which

BRIEF DESCRIPTION OF THE DRAWING

FIG. 3 shows a frame with a frame plate of the kitchen machine of FIG. 1.

DETAILED DESCRIPTION OF THE PREFERRED EMBODIMENTS

Figure 1:
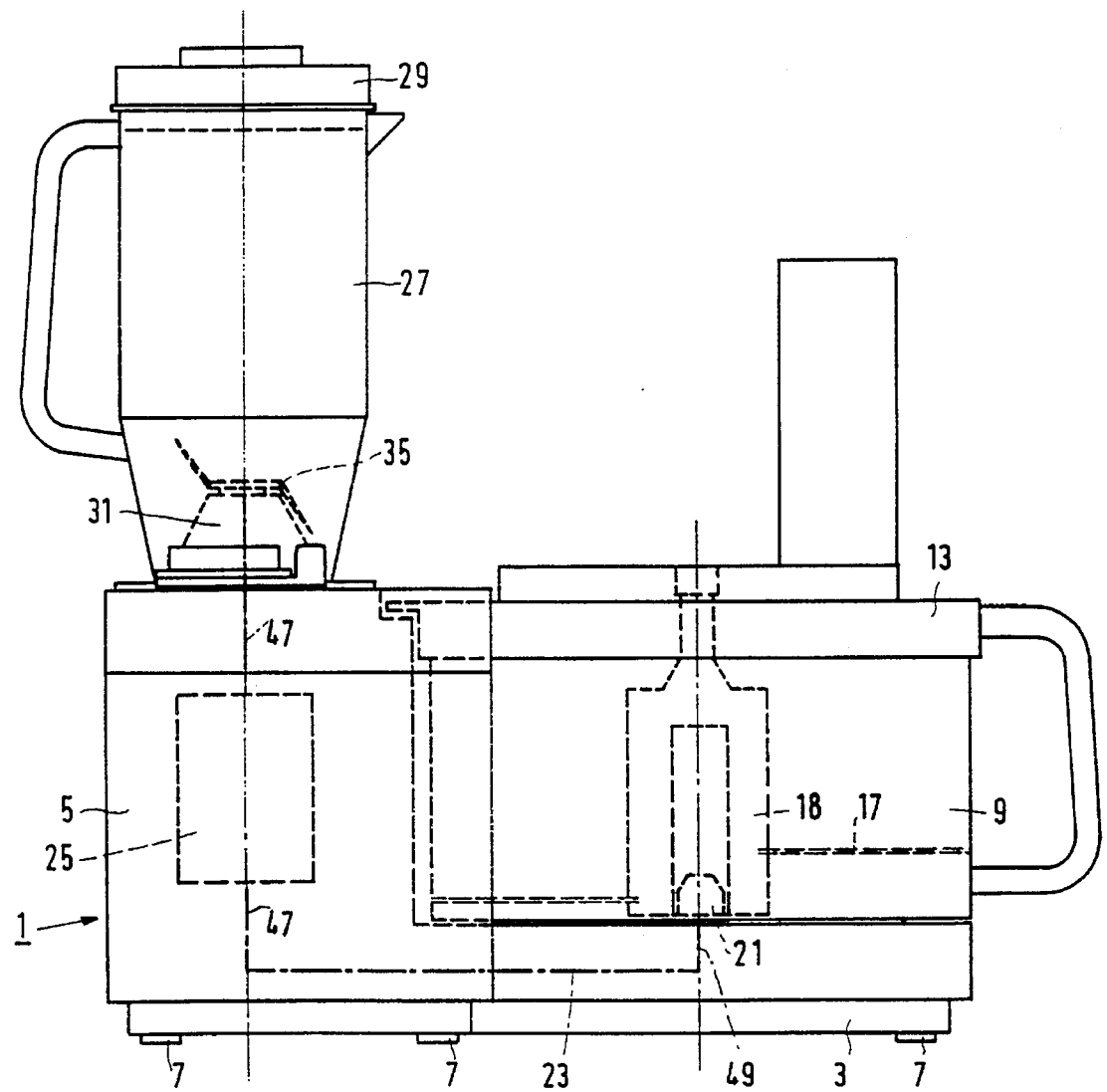
FIG. 1 is a front elevation of a kitchen machine according to the invention.

The kitchen machine shown in FIGS. 1 to 5 is provided with a housing 1 of synthetic resin with a base 3 and a motor housing 5 arranged on the base 3. The base 3 is provided with a number of feet 7 with which the kitchen machine can be placed on a supporting surface. A transparent bowl 9 can be placed on the base 3 next to the motor housing 5 and can be locked on the base 3 by means of a bayonet catch 11 (see FIG. 2). The bowl 9 can be closed with a lid 13 which can be locked on the bowl by means of a bayonet catch 15 (see FIG. 2).

Figure 2:
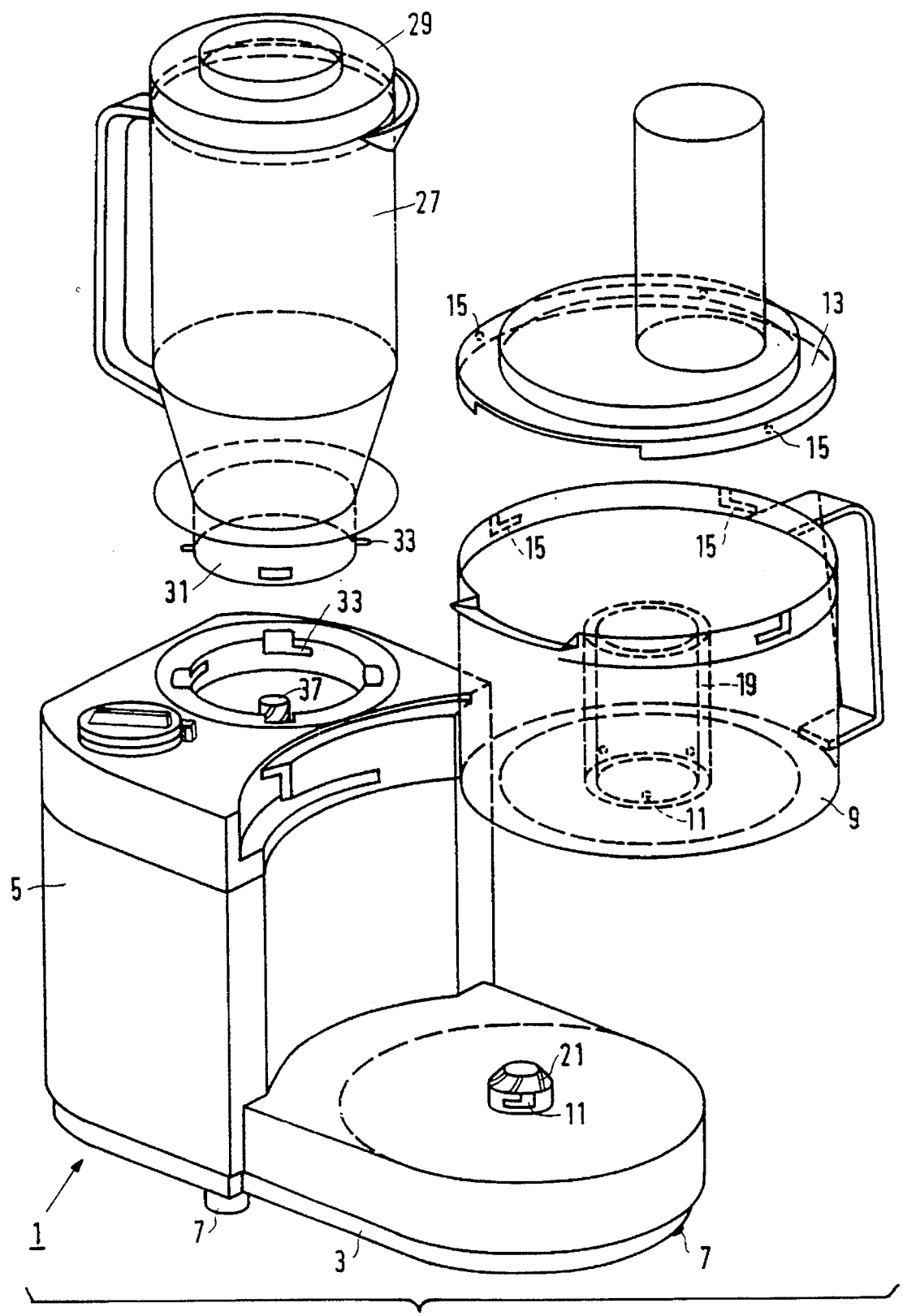
FIG. 2 shows the kitchen machine of FIG. 1 with a number of detached components.

A first tool, for example a cutting tool 17 with a tubular shaft 18, is rotatable in the bowl 9 about a central bush 19 of the bowl 9 shown in FIG. 2. The cutting tool 17 can be exchanged after the lid 13 has been removed. When the bowl 9 is placed on the base 3, the cutting tool 17 is coupled to a first coupling bush 21 which can be driven by an electric motor 25 arranged in the motor housing 5 via a transmission 23 which is depicted only diagrammatically in FIG. 1.

As can be seen in FIGS. 1 and 2, the kitchen machine is further provided with a transparent blender jug 27 with a lid 29 and a bottom portion 31 made of synthetic resin, which can be locked on the motor housing 5 by means of a bayonet catch 33. A second tool, for example a metal blender tool 35, has its rotation bearings in the bottom portion 31 of the blender jug 27. Unlike the cutting tool 17, the blender tool 35 is not exchangeable. When the blender jug 27 is placed on the motor housing 5, the blender tool 35 is coupled to a second coupling bush 37 which is visible in FIG. 2 and which can also be driven by the electric motor 25.

As FIG. 3 shows, there is in the housing 1 a frame 39 which is provided with a frame plate 41 extending into the base 3 and two parallel frame pins 43 and 45 fastened to the frame plate 41 and extending transverse to the frame plate 41 in the motor housing 5. The frame pin 45 is only partly visible in FIG. 3. The electric motor 25 is fastened to the frame pins 43 and 45. The second coupling bush 37 is fastened to an end of a motor shaft 47 of the electric motor 25 extending transverse to the frame plate 41, while the first coupling bush 21 is fastened to an end of a coupling shaft 49 of the transmission 23 directed substantially parallel to the motor shaft 47. As FIG. 3 shows, the coupling shaft 49 is rotatably supported by a bearing bush 51 fastened to the frame plate 41. A sheave 53 is fastened to the end of the coupling shaft 49 facing away from the first coupling bush 21, which sheave is coupled to a pinion 57, which is only partly visible in FIG. 3 and which is fastened to the end of the motor shaft 47 facing away from the second coupling bush 37, by means of a toothed belt 55. Thus the cutting tool 17 and the blender tool 35 are simultaneously driven by the electric motor 25 during operation.

As FIG. 3 shows, the bearing bush 51 of the coupling shaft 49 is situated in a support bush 59 of the base 3, a rubber ring 61 being provided between the support bush 59 and the bearing bush 51. The friction between the support bush 59 and the rubber ring 61 is comparatively small, so that the bearing bush 51 with the rubber ring 61 is axially displaceable relative to the support bush 59. The use of the support bush 59 and the rubber ring 61 prevents displacements of the frame 39 relative to the housing 1 parallel to an X-direction indicated in FIG. 3, transverse to the motor shaft 47, and a Y-direction which is transverse to the X-direction and to the motor shaft 47.

Figure 4A:
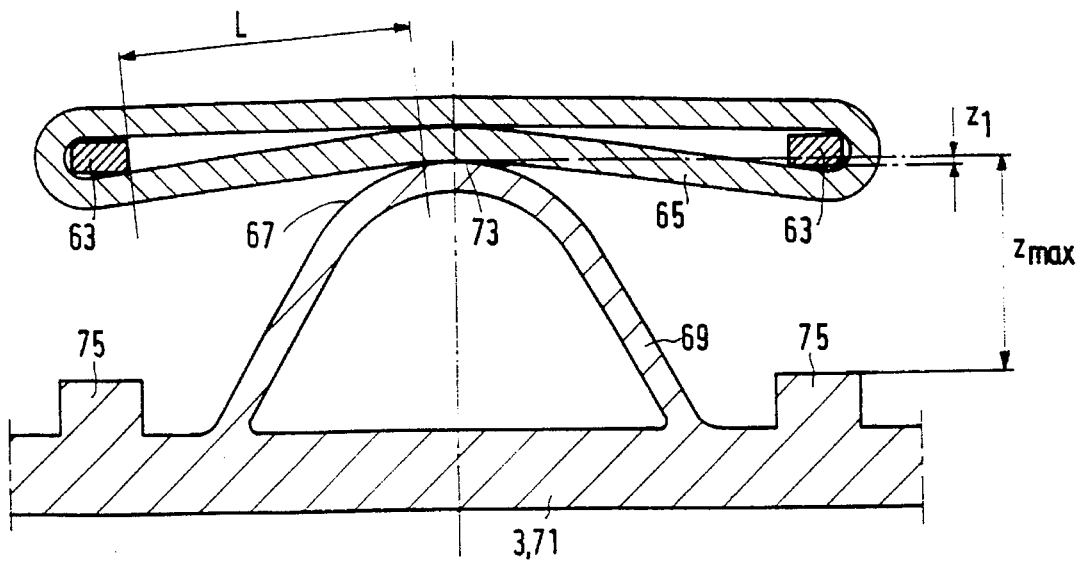
FIG. 4a is a cross-section of a suspension ring and a support ridge of the frame plate according to FIG. 3 in a situation where a comparatively low load acts on the frame.
Figure 4B:
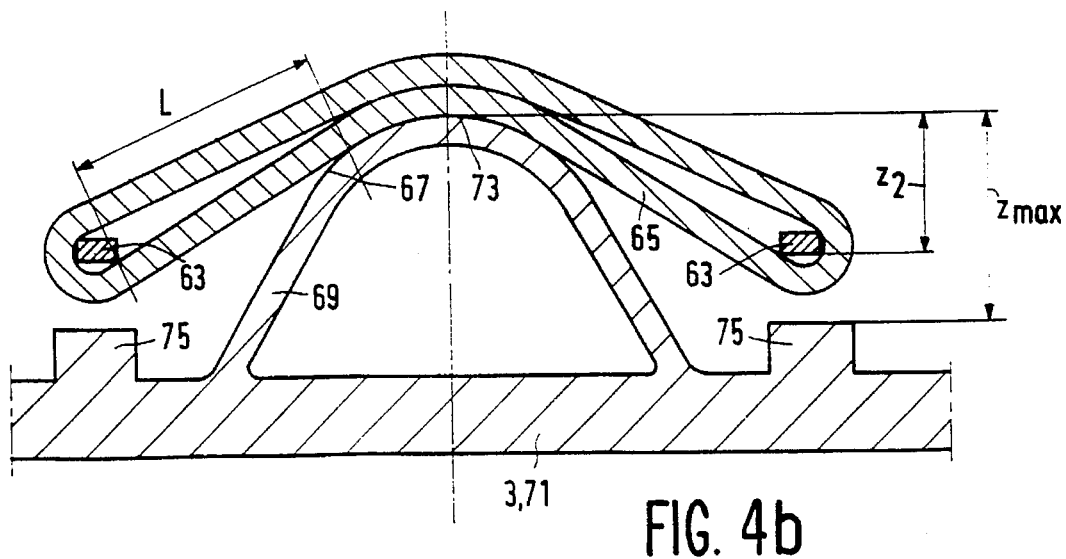
FIG. 4b is a cross-section of the suspension ring and the support ridge according to FIG. 4a in a situation in which a comparatively high load acts on the frame.

As is further shown in FIG. 3, the two ends of the frame plate 41 are each provided with two projections 63 directed parallel to the X-direction. An elastically deformable suspension ring 65 made of rubber is provided around each pair of projections 63, by means of which ring the frame plate 41 rests on the support surface 67 of two support ridges 69 made of synthetic resin, which each are integrated with a bottom plate 71 so as to form a portion of the base 3. As is visible in FIGS. 3, 4a and 4b, the support ridges 69 each have a curved end. The use of the curved ends achieves that a contact face 73 is present between the support ridges 69 and the suspension rings 65, the surface area of which depends on the mechanical load acting on the frame plate 41 in a direction parallel to the motor shaft 47. FIG. 4a shows one of the suspension rings 65 in a situation in which the said load on the frame plate 41 and the frame 39 is comparatively small. Such a situation occurs during normal operating conditions of the kitchen machine and also, for example, while noise tests are being carried out, with the electric motor 25 running without a load and the speeds of the electric motor 25 being comparatively high. The surface area of the contact face 73 in this situation is comparatively small, so that the effective length L of the suspension ring 65 depicted in FIG. 4a is comparatively great. The mechanical stiffness of the suspension ring 65 is comparatively low in this situation, so that the transmission to the housing of high-frequency vibrations caused during operation by the electric motor 25 and the transmission mechanism 23 is prevented to a substantial degree, and a good insulation of the noise caused by the electric motor 25 is provided. FIG. 4b shows a situation in which the said load on the frame plate 41 and the frame 39 is relatively high. Such a situation occurs, for example, when the kitchen machine is moved, transported, or dropped. The surface area of the contact face 73 in this situation is comparatively great owing to elastic deformation of the suspension ting 65, so that the effective length L of the suspension ring 65 is comparatively small. In this situation, the mechanical stiffness of the suspension ring 65 is comparatively high, so that comparatively great load fluctuations which may occur in the case of a high load on the frame 39 will cause only a slight deformation of the suspension ring 65 and slight displacements of the frame 39 parallel to the motor shaft 47.

Figure 4C:
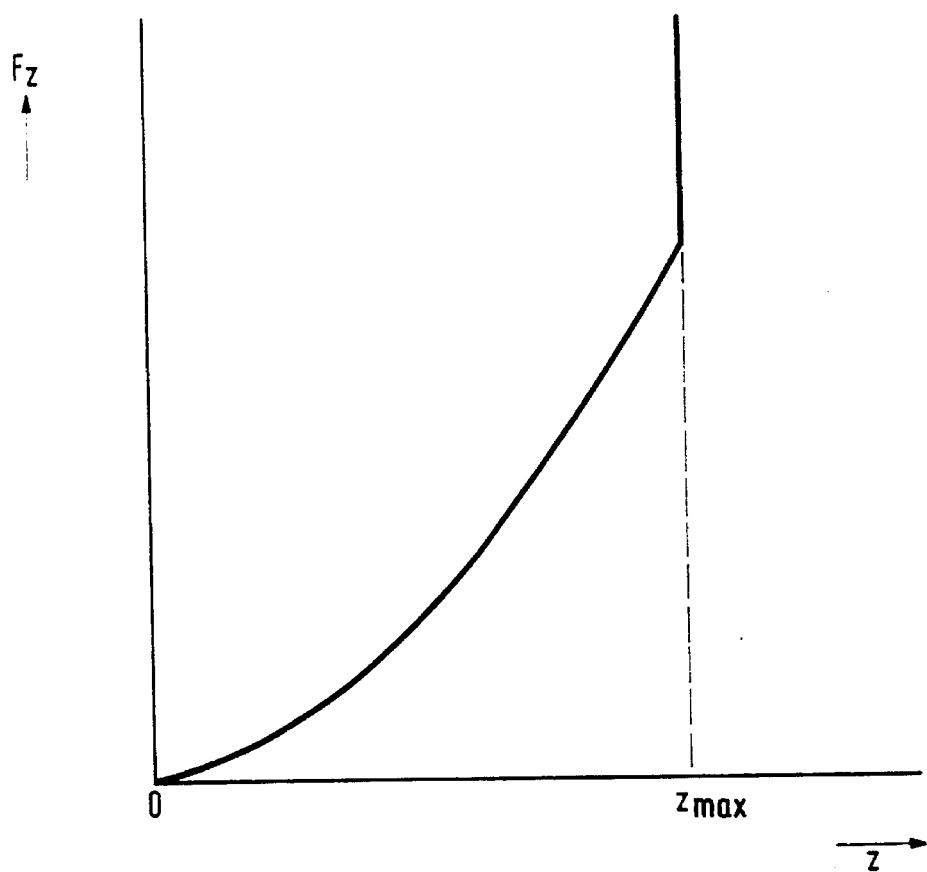
FIG. 4c shows the displacement of the frame plate of FIG. 3 as a function of the load acting on the frame plate.

As FIGS. 4a and 4b further show, the bottom plate 71 is provided near each of the two support ridges 69 with two stops 75 against which the projections 63 abut at extremely high loads on the frame plate 41. It is noted that the relationship between the mechanical stiffness of the suspension rings 65 and the load on the frame plate 41 is determined inter alia by the curvature of the support surfaces 67. By optimizing the curvature of the support surfaces 67, it is possible to obtain a favourable relationship between the mechanical stiffness of the suspension rings 65 and the load acting on the frame plate 41. FIG. 4c shows the displacement z of the frame plate 41 in a direction parallel to the motor shaft 47 as shown in FIGS. 4a and 4b as a function of the load $F_z$ acting on the frame plate 41 in the said direction. Since the mechanical stiffness of the suspension rings 65 increases with an increase in the load $F_z$ on the frame plate 41, the load $F_z$ required for a given displacement z increases more than linearly with the displacement z. Knocking of the frame plate 41 against the stops 73 is prevented as much as possible in this manner.

As is shown in FIG. 3, the bottom plate 71 further comprises two projections 77 near one of the support ridges 69, which projections prevent a rotation of the frame plate 41 and the frame 39 about the centerline of the bearing bush 51. Furthermore, the ends of the frame pins 43 and 45 facing away from the frame plate 41 are each arranged in a support bush 79 of the motor housing 5, a rubber ring 81 being provided between the said end of each of the frame pins 43 and 45 and the support bushes 79. The support bush 79 of the frame pin 45 only is visible in FIG. 3. The use of the support bushes 79 and the rubber rings 81 prevents a rotation of the frame 39 about a pivot axis directed parallel to the X-direction and a pivot axis directed parallel to the Y-direction.

Figure 5:
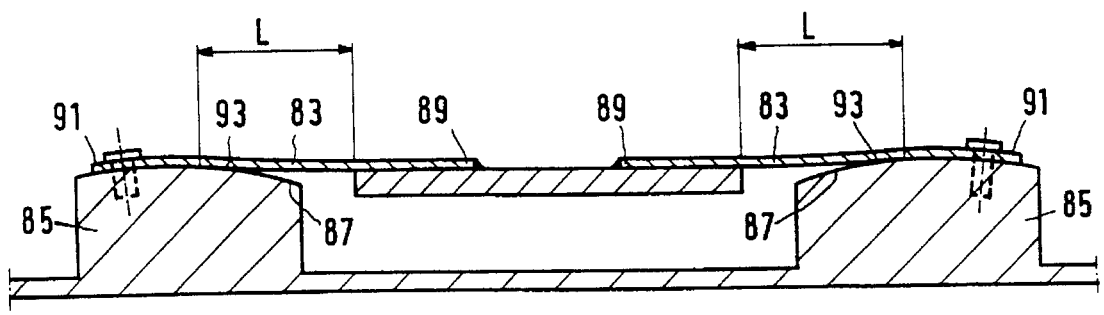
FIG. 5 is a cross-section of an alternative suspension element and an alternative support member of the frame according to FIG. 3.

Alternative types of suspension elements and alternative types of support members may be used instead of the elastically deformable suspension rings 65 of rubber and the support ridges 69. FIG. 5 shows a pair of alternative suspension elements and a pair of alternative support members. The alternative suspension element is a leaf spring 83, while the alternative support member is a support wall 85 with a curved support surface 87. A first end 89 of the leaf spring 83 is welded to the frame plate 41, while a second end 91 is screwed to the support surface 87 of the support wall 85. The leaf spring 83 bears on the support surface 87, a contact face 93 being present between the support surface 87 and the leaf spring 83 whose surface area increases under elastic deformation of the leaf spring 83 with an increase in the mechanical load acting on the frame plate 41 in a direction parallel to the motor shaft 47. Thus the leaf spring 83 also has an effective length L (see FIG. 5) which decreases and a mechanical stiffness which increases with an increase in the said load. Instead of each suspension ring 65, two leaf springs 83 arranged in opposition may be used, as FIG. 5 shows. The leaf springs 83 are generally less prone to wear than the suspension rings 65 and accordingly have a longer life. The second end 91 of the leaf spring 83 may also be fastened to the housing 1 or the base 3 in a different location.

The kitchen machine described above has two attachments, i.e. the bowl 9 with the cutting tool 17 and the blender jug 27 with the blender tool 35. It is noted that the invention is also applicable to other types of kitchen machines which are provided with one or several attachments, in which a rotatable tool of the attachment can be driven by an electric motor arranged in a housing of the kitchen machine. Examples which may be mentioned are a kitchen machine disclosed in British Patent Application GB-2,082,713-A, which comprises a rotatable bowl which can be positioned next to a motor housing and a transverse arm which can be placed on the motor housing and which has a beater which can rotate in the bowl, and the kitchen machine disclosed in European Patent Application 0 409 335 A1, on which only one attachment can be placed next to a motor housing.

It is further noted that the invention is also applicable to kitchen machines having a different frame construction than the kitchen machine described above, in which the frame 39 .comprises a frame plate 41 and two frame pins 43 and 45. A possible example is a kitchen machine known from German Patent Application DE 32 05 710 A1 which has a frame consisting of a single, cup-shaped part to which both the electric motor and the transmission are fastened.

It is also noted that instead of the projections 63 and the suspension ring 65 an alternative construction may be used in which, for example, the frame plate 41 has a recess and a rubber strip is arranged in the said recess and is fastened to the frame plate 41 with both ends near two opposing sides of the recess. Such a rubber strip, however, is more difficult to mount than the suspension ring 65 described above, which need merely be passed over the projections 63.

Finally, it is noted that the frame plate 41 may also be suspended from more than two suspension rings 65, for example, from three or four suspension rings 65. The use of the two suspension rings 65 depicted in FIG. 3, however, generally provides a sufficient support for the frame plate 41 and the frame 39 in a direction parallel to the motor shaft 47, while tilting of the frame 39 about a pivot axis directed parallel to the X-direction and a pivot axis directed parallel to the Y-direction is prevented through the use of the support bushes 79 and rubber rings 81 referred to above.

We claim:

1. A kitchen machine having improved damping of noise transmitted to the housing during operation which comprises a housing; a frame fastened to the housing via at least one elastic element; an electric motor arranged in the housing and fastened to said frame; and a rotatable tool which is drivable by the electric motor; the elastic element comprising an elastically deformable suspension element having a mechanical stiffness and supported by a support member of the housing; a contact face having a surface area being present between the suspension element and the support member, said mechanical stiffness of the suspension element depending on the surface area of the contact face, wherein said surface area of the contact face and the mechanical stiffness of the suspension element depending on the said surface area increase with an increase in the mechanical load acting on the frame.

2. A kitchen machine as claimed in claim 1, wherein the suspension element rests on a curved support surface of the support member.

3. A kitchen machine as claimed in claim 1, wherein the suspension element is an elastically deformable suspension ring which is provided around two projections of the frame.

4. A kitchen machine as claimed in claim 3, wherein the support member is a support ridge with a curved end provided on a bottom plate of the housing, while the two projections of the frame are present on either side of the support ridge.

5. A kitchen machine as claimed in claim 3, in which the frame comprises a frame plate, provided with at least two pairs of projections and supported by at least two support members of the housing via at least two suspension rings.

6. A kitchen machine as claimed in claim 1, wherein the suspension element is a leaf spring whose first end is fastened to the frame and whose second end is fastened to the housing.

7. A kitchen machine as claimed in claim 2 in which the suspension element is an elastically deformable suspension ring which is provided around two projections of the frame.

8. A kitchen machine as claimed in claim 4 in which the frame comprises a frame plate, characterized in that the frame plate is provided with at least two pairs of projections and is supported by at least two support members of the housing via at least two suspension rings.

9. A kitchen machine as claimed in claim 2 in which the suspension element is a leaf spring whose first end is fastened to the frame and whose second end is fastened to the housing.

10. A kitchen machine which comprises a housing; a frame fastened to the housing via at least one elastic element; an electric motor arranged in the housing and fastened to said frame; and a rotatable tool which is drivable by the electric motor; the elastic element comprising an elastically deformable suspension element having a mechanical stiffness and supported by a support member of the housing; a contact face having a surface area being present between the suspension element and the support member, said mechanical stiffness of the suspension element depending on the surface area of the contact face, wherein said surface area of the contact face and the mechanical stiffness of the suspension element depending on the said surface area are comparatively small when the mechanical load acting on the frame is comparatively small, and comparatively large when the mechanical load acting on the frame is comparatively large.

\* \* \* \* \*